(12) United States Patent
Saito

(10) Patent No.: US 7,627,697 B2
(45) Date of Patent: Dec. 1, 2009

(54) DEVICE USING MULTIPLE DMA CONTROLLERS FOR TRANSFERRING DATA BETWEEN A STORAGE DEVICE AND MULTIPLE PROCESSING UNITS

(75) Inventor: Seiichiro Saito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 402 days.

(21) Appl. No.: 10/896,887

(22) Filed: Jul. 23, 2004

(65) Prior Publication Data

US 2005/0160200 A1    Jul. 21, 2005

(30) Foreign Application Priority Data

Jan. 16, 2004  (JP) .............................. 2004-009351

(51) Int. Cl.
*G06F 13/28*  (2006.01)
(52) U.S. Cl. ........................ 710/22; 345/501; 345/522
(58) Field of Classification Search ............. 710/22–28; 345/501–522
See application file for complete search history.

(56) References Cited

U.S. PATENT DOCUMENTS

| | | | |
|---|---|---|---|
| 4,862,407 A | | 8/1989 | Fette et al. |
| 5,315,708 A | * | 5/1994 | Eidler et al. ................. 711/119 |
| 5,430,885 A | | 7/1995 | Kaneko et al. |
| 5,485,624 A | * | 1/1996 | Steinmetz et al. ............. 712/34 |
| 5,666,520 A | | 9/1997 | Fujita et al. |
| 5,894,586 A | | 4/1999 | Marks et al. |
| 6,342,892 B1 | | 1/2002 | Van Hook et al. |
| 6,370,601 B1 | | 4/2002 | Baxter |
| 6,421,744 B1 | | 7/2002 | Morrison et al. |
| 6,779,049 B2 | * | 8/2004 | Altman et al. ................ 710/22 |
| 6,820,142 B2 | * | 11/2004 | Hofstee et al. ................ 710/25 |
| 6,820,187 B2 | * | 11/2004 | Asano et al. .................. 712/21 |
| 6,865,631 B2 | * | 3/2005 | Hofstee et al. .............. 710/220 |
| 2002/0138697 A1 | * | 9/2002 | Kanda .......................... 711/114 |
| 2005/0081202 A1 | * | 4/2005 | Brokenshire et al. ........ 718/100 |

FOREIGN PATENT DOCUMENTS

| | | |
|---|---|---|
| EP | 0 945 788 A2 | 9/1999 |
| JP | 57-111722 * | 7/1982 |
| JP | 11-65989 | 3/1999 |
| JP | 2001-216227 | 8/2001 |
| JP | 2002-163239 | 6/2002 |
| WO | WO 00/77627 A1 | 12/2000 |

OTHER PUBLICATIONS

Definition: "BIOS" www.techweb.com, Jul. 12, 2007.*
Flik Thomas, "Mikroprozessortechnik", Springer Verlag, XP-002383180, 2001, pp. 516-529.
"Application of DMA Tecnology in Realtime Image Processing", Chongqing University Journal, issue 12, vol. 26, pp. 22-24.
"Application of DMA in Realtime Image Processing", Single Chip an dEmbedded System Application, issue 11, 2002, pp. 23-25, and 28.

* cited by examiner

*Primary Examiner*—Eron J Sorrell
(74) *Attorney, Agent, or Firm*—Oblon, Spivak, McClelland, Maier & Neustadt, L.L.P.

(57) ABSTRACT

A processor system including a plurality of arithmetic units capable of performing arithmetic processing in parallel; a storage which stores data that the arithmetic units use for arithmetic processing; a plurality of DMA controllers which perform data transfer between the arithmetic units, and between the arithmetic units and the storage in parallel with processing of a host processor; and a DMA control circuit which controls start-up the arithmetic units and the DMA controllers in parallel with processing of the host processor.

13 Claims, 19 Drawing Sheets

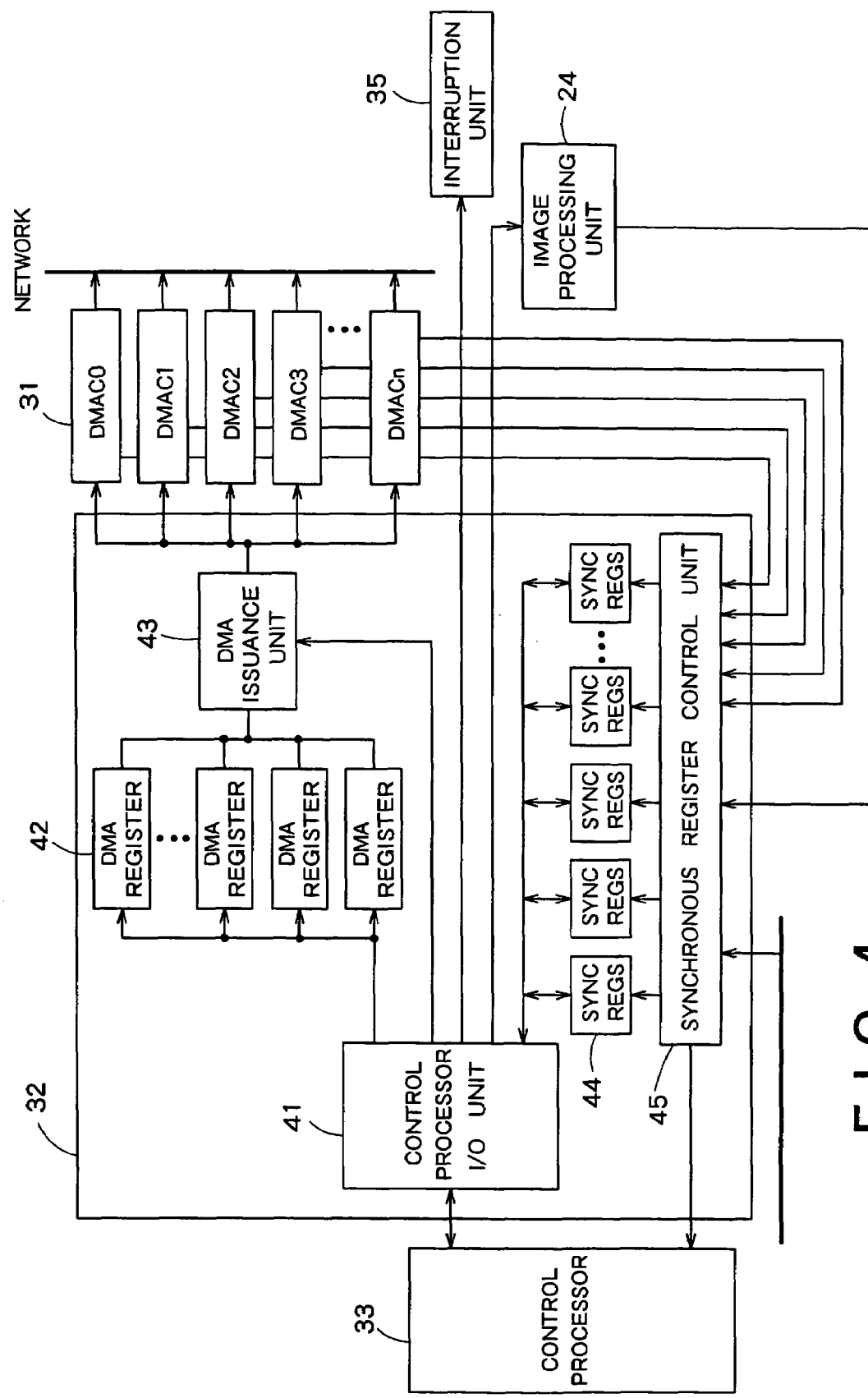
F I G. 4

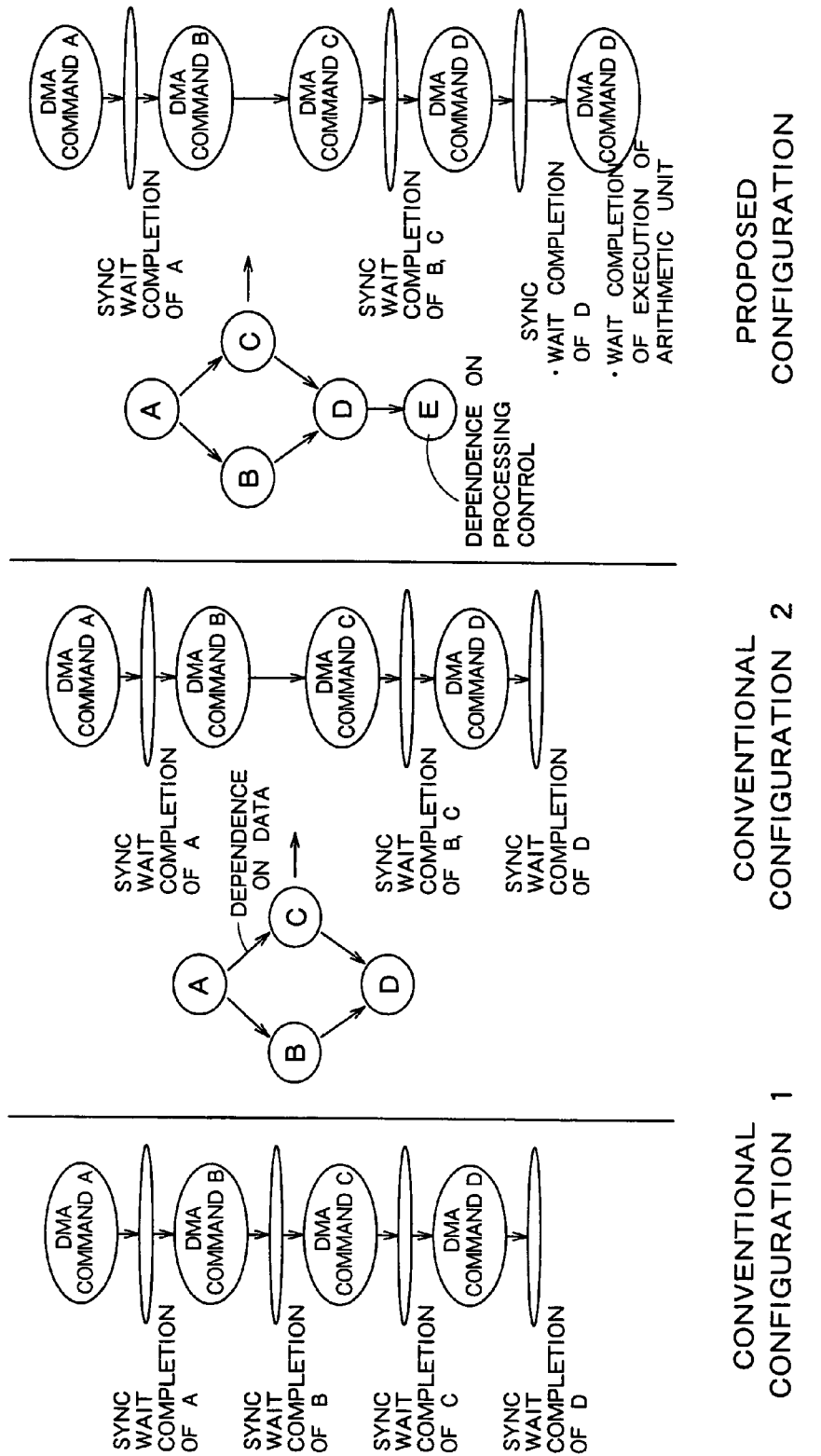

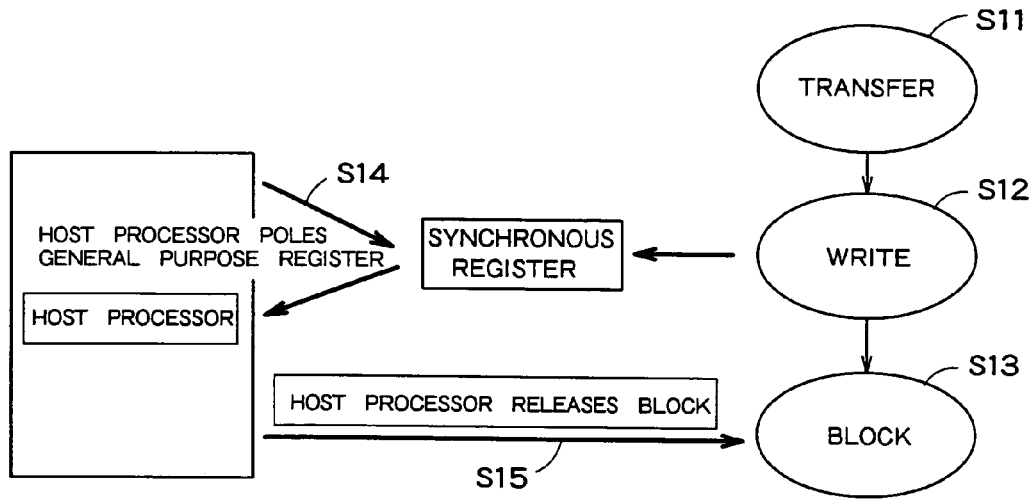
F I G. 11
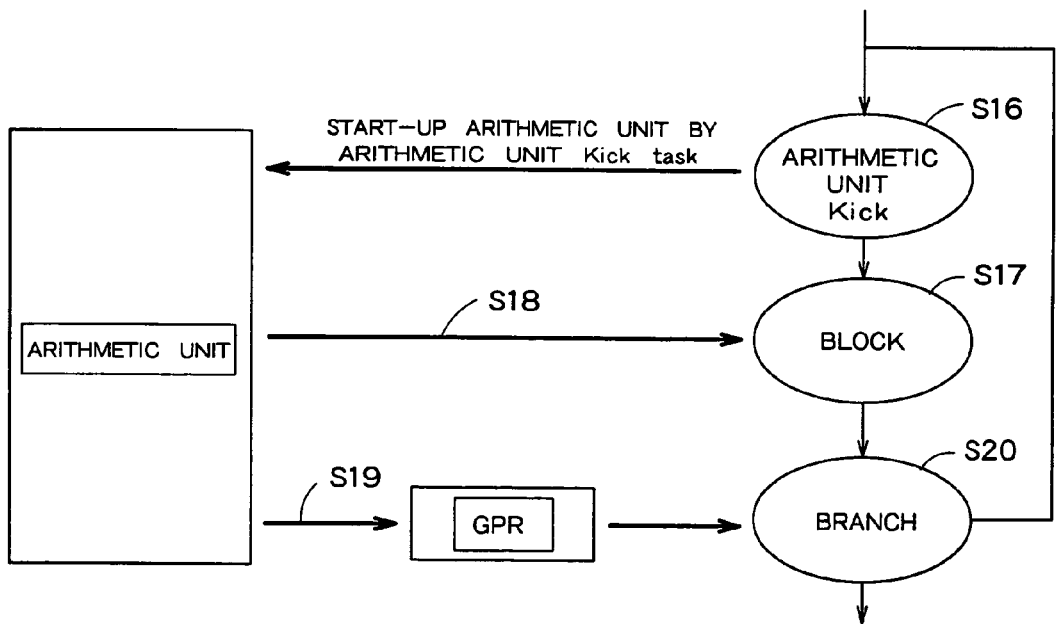
F I G. 12

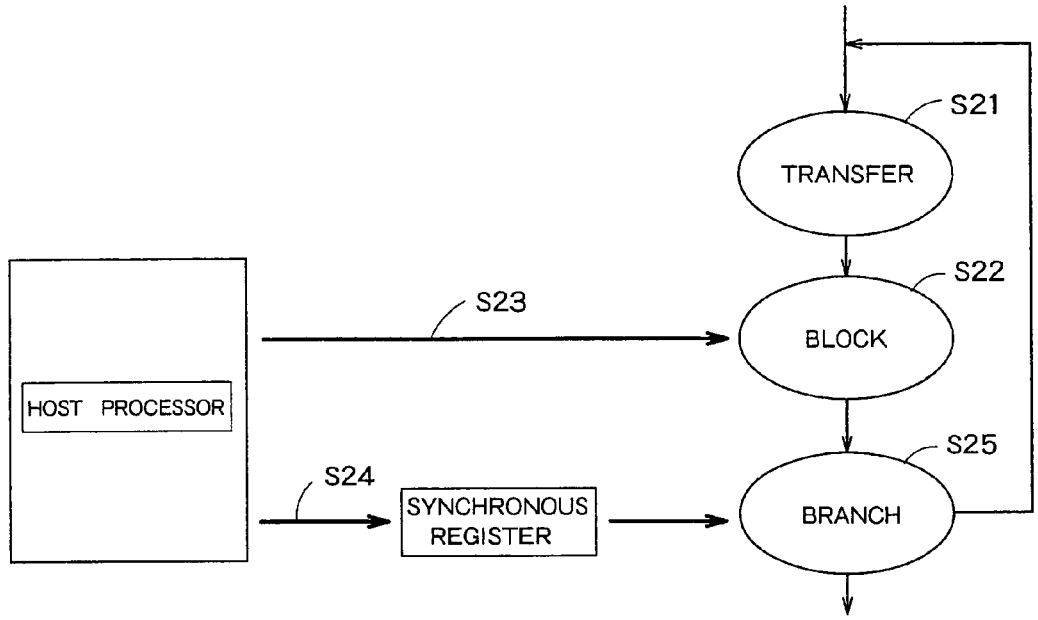
F I G. 13
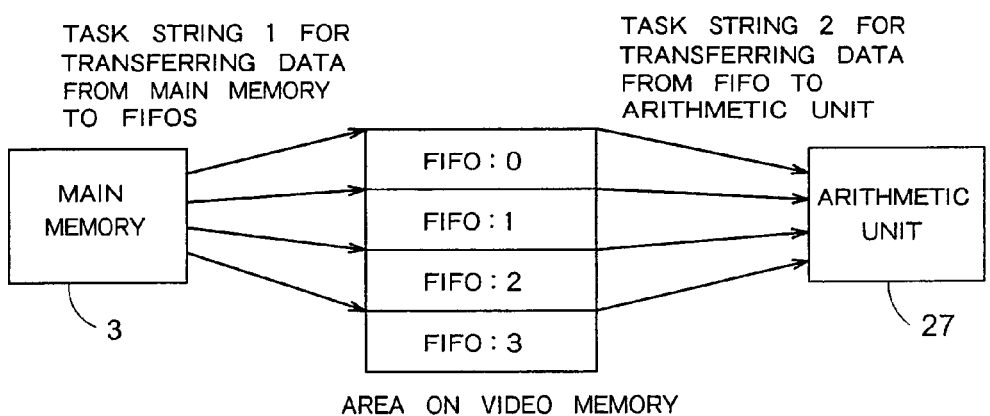
F I G. 14

```
/******** INITIALIZATION ********/
int depth=0;
//TRANSFER TaskString FROM MainMem TO DMA MEMORY
ts_transfer (TaskString1_MainMem_addr, TaskString1_LDPCUMEM_addr, TaskString1_size) ;
ts_transfer (TaskString2_MainMem_addr, TaskString2_LDPCUMEM_addr, TaskString2_size) ;
//REGISTER Task String TO TSS
ts_init (TSS0, TaskString1_LDPCUMEM_addr, contextID, TaskString1_tag) ;
ts_init (TSS1, TaskString2_LDPCUMEM_addr, contextID, TaskString2_tag) ;
START-UP TSS
ts_ctrl (TSS0, EXECUTE) ;
ts_ctrl (TSS1, EXECUTE) ;

/******** MAIN ROUTINE********/
while (1) {
    //IF TaskString1 WAITS RELEASE BY HOST PROCESSOR, AND FIFO IS NOT FULL
    if ((depth<3) && (ts_status(TSS0)==TSS HOSTWAIT)) {
        depth++;
        ts_ctrl(TSS0, ACTIVATE) ;
    }
    //IF TaskString2 WAITS RELEASE BY HOST PROCESSOR, AND THERE IS DATA IN FIFO
    if ((depth>0) && (ts_status(TSS1)==TSS HOSTWAIT)) {
        depth--;
        ts_ctrl(TSS1, ACTIVATE) ;
    }
}
```

F I G. 16

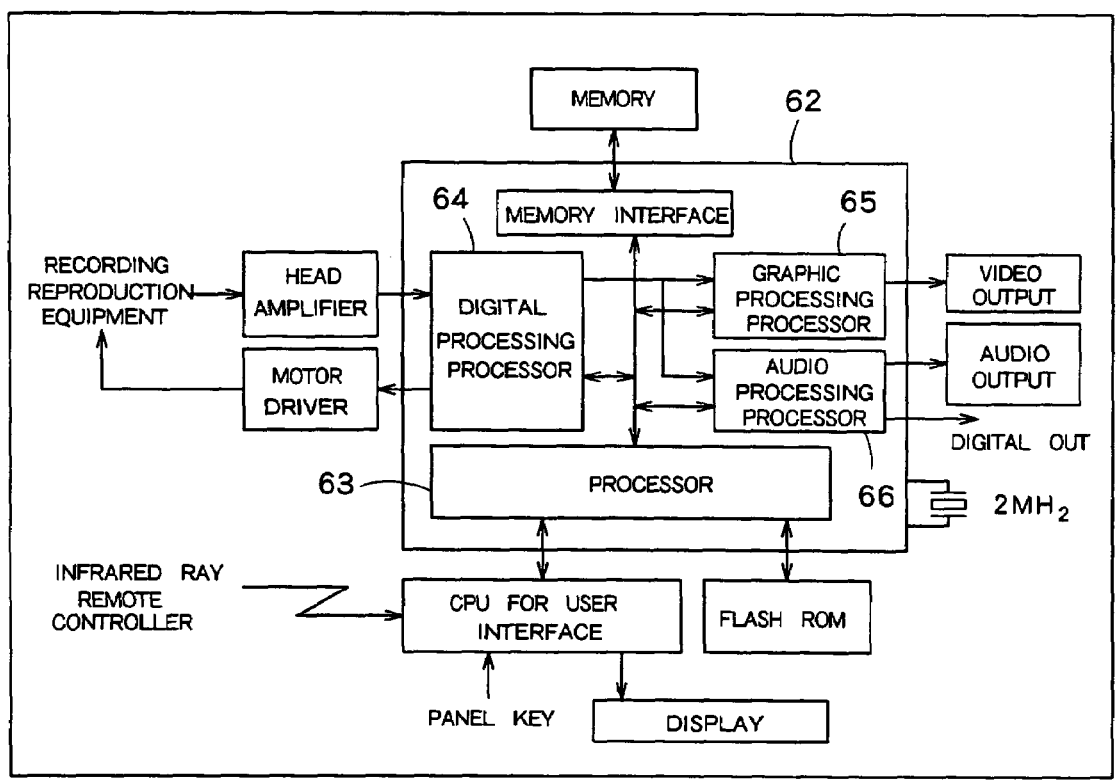
F I G. 21

DEVICE USING MULTIPLE DMA CONTROLLERS FOR TRANSFERRING DATA BETWEEN A STORAGE DEVICE AND MULTIPLE PROCESSING UNITS

CROSS REFERENCE TO RELATED APPLICATIONS

This application claims benefit of priority under 35USC § 119 to Japanese Patent Application No. 2004-9351, filed on Jan. 16, 2004, the entire contents of which are incorporated by reference herein.

BACKGROUND OF THE INVENTION

1. Field of the Invention

The present invention relates to a processor system which can perform a data transfer process by DMA (Direct Memory Access), a DMA control circuit, a DMA control method, a control method for DMA controller, a graphic processing method, and a graphic processing circuit.

2. Related Background Art

In conventional DMA transfer, data transfer is performed in parallel with an operation of a host processor to reduce processing load on the host processor. While the DMA transfer is performed, the host processor can perform another process. For this reason, the DMA transfer is suitably applied to a case in which a large amount of data such as image data is transferred.

A DMA transfer is generally performed under the control of a DMA controller. A host processor sets transfer control information representing time when a DMA transfer is performed, a position from which the DMA transfer is performed, and a position to which the DMA transfer is performed in the DMA controller in advance. According to the setting information, the DMA controller performs the DMA transfer.

On the other hand, as a method of increasing the speed of a process in a processor system, there is known a method in which a plurality of arithmetic units are arranged and operated in parallel to each other. In this case, calculation process results of the plurality of arithmetic units are desirably transferred in parallel to each other, and a plurality of DMA controller may be arranged.

However, when the plurality of DMA controllers are arranged to make it possible to perform data transfer processes in parallel to each other, the host processor must set pieces of transfer control information for the DMA controllers, processing load on the host processor increases. The processing load increases in proportion to the number of DMA controllers.

SUMMARY OF THE INVENTION

In accordance with one aspect of the present invention, a processor system is provided. The processor system preferably includes a plurality of arithmetic units capable of performing arithmetic processings in parallel, and a storage configured to store data that the arithmetic units use for arithmetic processing.

In addition, the processor system preferably includes a plurality of DMA controllers which perform data transfer between the arithmetic units, and between the arithmetic units and the storage in parallel with processings of a host processor. Furthermore, the system may also include DMA control circuit which controls start-up of the arithmetic units and the DMA controllers in parallel with processings of the host processor.

In accordance with another aspect of the present invention, a DMA control circuit is provided. The DMA control circuit preferably includes a plurality of instruction storages which store information relating to instructions instructed from a host processor, respectively, and a scheduler which performs data transfer between a plurality of arithmetic units each being capable of performing arithmetic processings in parallel, data transfer between a storage which stores data that the arithmetic units use for arithmetic processings and the arithmetic units, and starting control of the arithmetic units, based information stored in the instruction storages, in parallel with processings of the host processor.

In accordance with yet another aspect of the present invention, a method of controlling a DMA controller is provided. The method preferably includes the steps of storing data that arithmetic units can process processing in parallel into a storage; and performing data transfer by using DMA controllers in parallel with processings of a host processor, between the arithmetic units, and between the arithmetic units and the storage. In addition, the method preferably also includes the step of transmitting data transfer completion information expressing completion of data transfer, by monitoring the DMA controllers and the arithmetic processing units, and determining whether or not other data transfer is possible, based on the data transfer completion information. The method preferably also includes the step of performing data transfer by using one of the DMA controllers when determined that data transfer is possible.

In accordance with still another aspect of the present invention, a graphic processing method is provided. The graphic processing method preferably includes the steps of converting vertex information into pixel information, generating an image by a plurality of arithmetic units based on the pixel information, and storing data that the arithmetic units which are capable of performing the arithmetic processings in parallel use for the arithmetic processings, into a storage. In addition, the method preferably further includes the steps of performing data transfer by using DMA controllers between the arithmetic units, and between the arithmetic units and the storage, transmitting data transfer completion information expressing that data transfer has been completed, by monitoring said DMA controllers and arithmetic units, and determining whether or not other data transfer is possible, based on the data transfer completion information. Furthermore, the method can also include the step of performing data transfer by at least one DMA controller when it is determined that the other data transfer is possible.

In accordance with another aspect of the present invention, a graphic processing circuit is provided. The processing circuit preferably includes a pixel information converter which converts vertex information into pixel information, a plurality of arithmetic units capable of performing arithmetic processings in parallel based on the pixel information, and a plurality of DMA controllers which perform data transfer between the arithmetic units, and data transfer between a storage which stores data used by the arithmetic units and the arithmetic units themselves. In addition, the processing circuit further includes an instruction information storage which stores instruction information relating to DMA transfers; and a control circuit which determines whether DMA transfer by the DMA controllers is possible, based on instruction information stored in the instruction information storage.

BRIEF DESCRIPTION OF THE DRAWINGS

FIG. 4 is a block diagram showing an example of the internal configuration of the dedicated circuit 32 in FIG. 3.

FIG. 7A is a diagram showing a first operation of a conventional DMAC 31, FIG. 7B is a diagram showing a second operation of the conventional DMAC 31, and FIG. 7C is a diagram showing an operation of the DMAC 31 according to this embodiment.

FIG. 11 is a diagram showing one example of how to use the sync register.

FIG. 12 is a diagram showing another example of how to use the sync register.

FIG. 13 is a diagram showing another example of how to use the sync register.

FIG. 14 is a diagram showing a method of processing two instruction strings.

FIG. 16 is a diagram showing one example of a program of the host processor 1.

FIG. 21 is a block diagram showing an example in which the processor system according to this embodiment is built in a video recorder/player.

DETAILED DESCRIPTION OF THE INVENTION

A processor system, a DMA control circuit, a DMA control method, a control method for a DMA controller, a graphic processing method, and a graphic processing circuit according to an embodiment of the present invention will be described below with reference to the accompanying drawings.

First Embodiment

Figure 1:
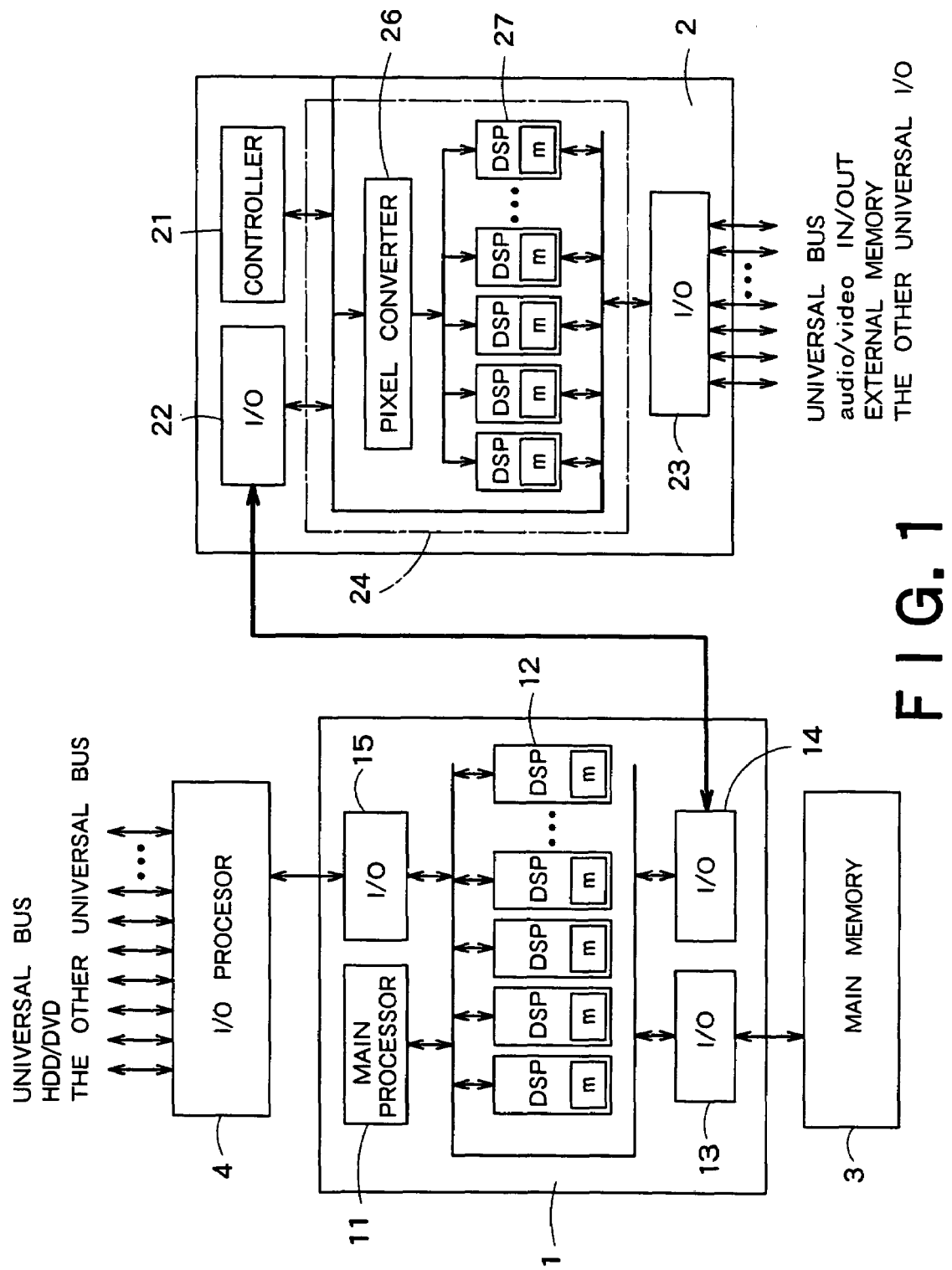
FIG. 1 is a block diagram showing a schematic configuration of a processor system according to the first embodiment of the present invention.

FIG. 1 is a block diagram showing a schematic configuration of a processor system according to the first embodiment of the present invention. The processor system shown in FIG. 1 includes a host processor 1, a graphic processing processor 2, a main memory 3, and an I/O processor 4.

The host processor 1 includes a main processor 11, a plurality of digital signal processors (DSP) 12, and I/O units 13, 14, and 15 which controls input/output operations with an external circuit. The I/O unit 13 controls input/output operations with the main memory 3, the I/O unit 14 controls the input/output operations with the graphic processing processor 2, and the I/O unit 15 controls the input/output operations with the I/O processor 4.

The graphic processing processor 2 includes a controller 21 serving as a characteristic part of this embodiment, an I/O unit 22 which performs data exchange with the host processor 1, various universal buses such as a PCI bus, an I/O unit 23 which controls input/output operations of video data, audio data, or the like, and a graphic processing unit 24 which performs graphic processing calculation.

The graphic processing unit 24 includes a pixel converters 26 which converts the vertex information of a polygon into pixel data and a plurality of arithmetic units (DSP) 27 which process the pixel data.

The I/O processor 4 controls connection to a universal bus, a peripheral devices such as an HDD and a DVD or the like, and a network.

Figure 2:
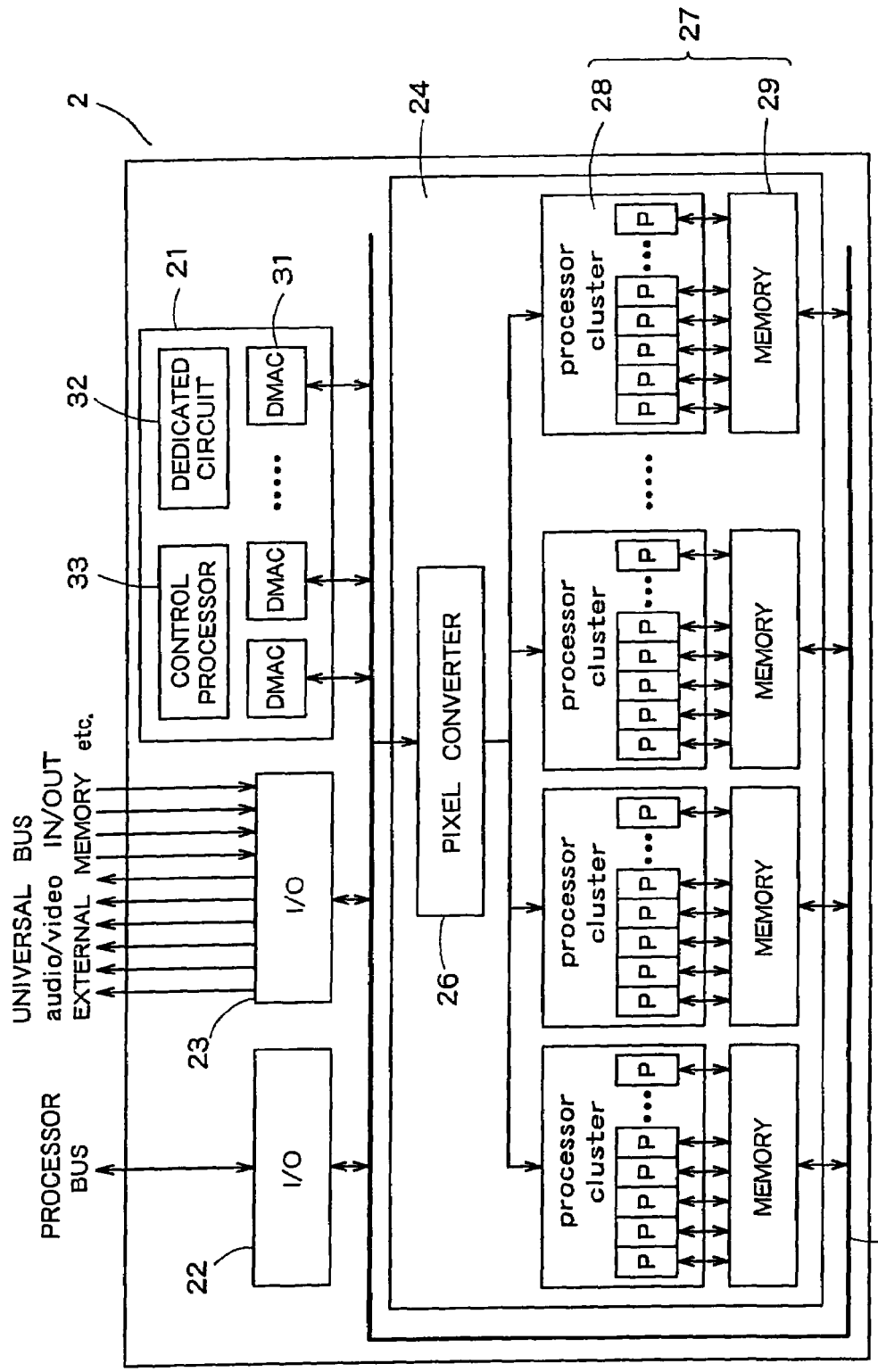
FIG. 2 is a block diagram showing the details of the internal configuration of the graphic processing processor 2 shown in FIG. 1.

FIG. 2 is a block diagram showing the details of the internal configuration of the graphic processing processor 2 shown in FIG. 1. Each of the plurality of arithmetic units 27 includes a processor cluster 28 constituted by a plurality of processors and a memory 29 which stores a processing results of the processor cluster 28. The plurality of processors in the processor cluster 28 can execute independent processes in parallel to each other, and can execute one process such that the plurality of processor cluster 28 share the process. The memory 29 stores an execution result of the processor cluster 28. The controller 21, the pixel converters 26, the I/O units 22 and 23, and the memory 29 which are shown in FIG. 2 are connected to a common bus 30.

Figure 3:
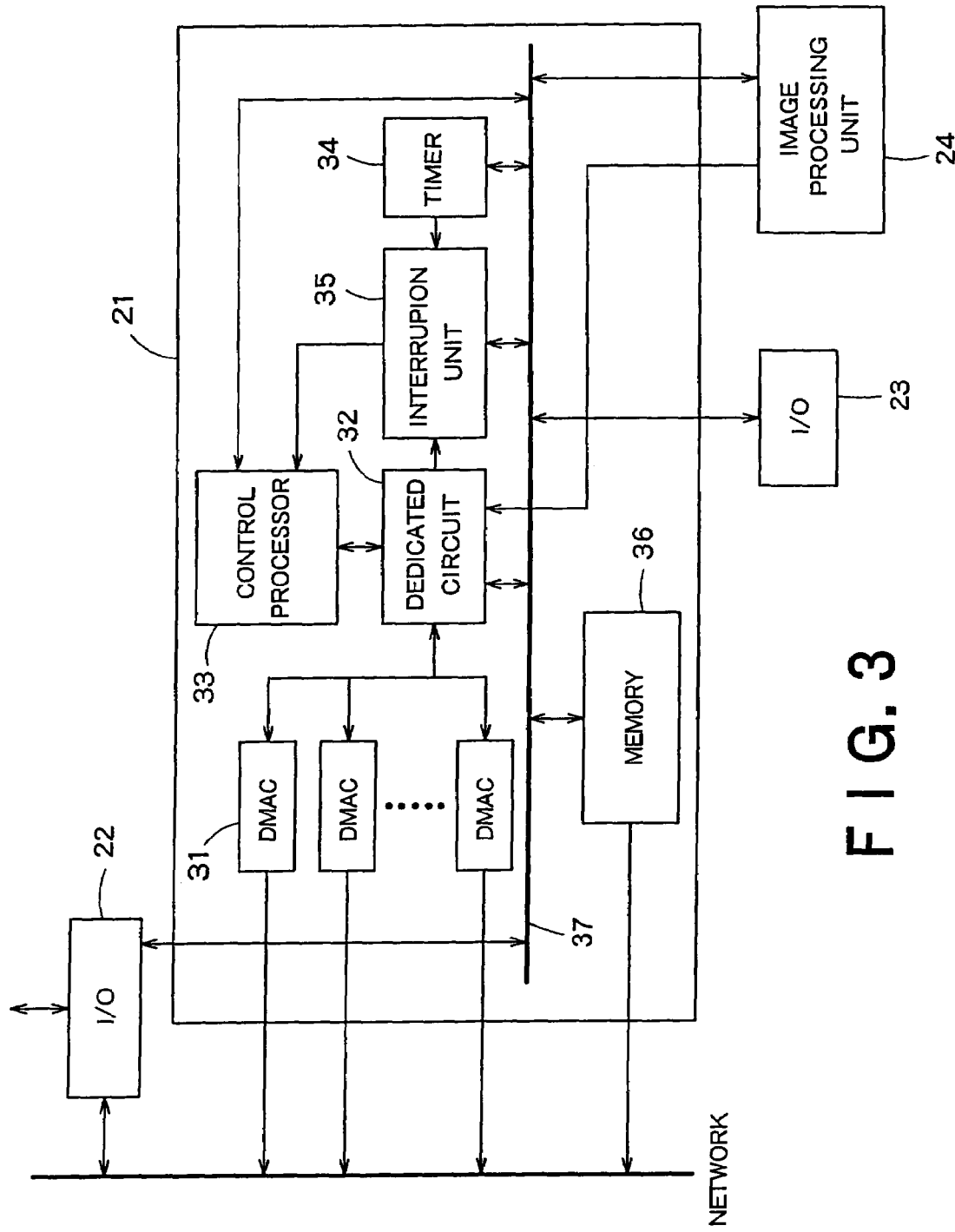
FIG. 3 is a block diagram showing an example of the internal configuration of the controller 21.

FIG. 3 is a block diagram showing an example of the internal configuration of the controller 21. The controller 21 shown in FIG. 3 includes a plurality of DMA controllers (DMAC) 31, a dedicated circuit 32, a control processor 33 constituted by general-purpose processors, a timer 34, an interruption unit 35 and a memory 36.

The DMA controllers 31 perform data transfer between the plurality of arithmetic units 27 and between the plurality of arithmetic units 27 and the memory 36. The dedicated circuit 32 is a circuit which is dedicated to this system, and performs start-up control for the DMA controllers 31 and the arithmetic units 27. The control processor 33 controls the dedicated circuit 32 according to a program code stored in the memory 36 or an instruction from the host processor 1. The timer 34 performs time management and instructs the interruption unit 35 to perform interruption as needed. The interruption unit 35 receives a signal from the timer 34 or a completion signal from the DMA controllers 31 or the arithmetic units 27 to perform interruption to the control processor 33.

The dedicated circuit 32, the timer 34, the interruption unit 35, and the memory 36 shown in FIG. 3 are connected to a local network 37. The host processor 1 is also connected to the local network 37 through the I/O unit 22. The memory 36 is, for example, consisted of an embedded DRAM. The DMA controllers are, for example, provided more than 30 pieces.

FIG. 4 is a block diagram showing an example of the internal configuration of the dedicated circuit 32 in FIG. 3. This block diagram shows a configuration in which the dedicated circuit 32 is connected as a co-processor of the control processor 33. The dedicated circuit 32 in FIG. 4 includes a control processor I/O unit 41, a plurality of DMA registers 42, a DMA issuance unit 43, a plurality of sync registers 44, and a sync register control units 45.

The control processor I/O unit 41 exchanges data with the control processor 33. The DMA registers 42 stores various pieces of information required for the operations of the DMACs 31. The DMA issuance unit 43 performs a process of transferring the pieces of information in the DMA registers 42 to the DMACs 31. A specific DMA register from which the information is transferred and a specific DMAC 31 to which the information is transferred are determined by the control processor 33. The DMA issuance unit 43 is notified of the specific DMA register and the specific DMAC 31 through the control processor I/O unit 41. The sync registers 44 stores the operation states of the DMACs 31 and the arithmetic units 27. The sync register control units 45 controls updating of the sync registers 44.

Figure 5:
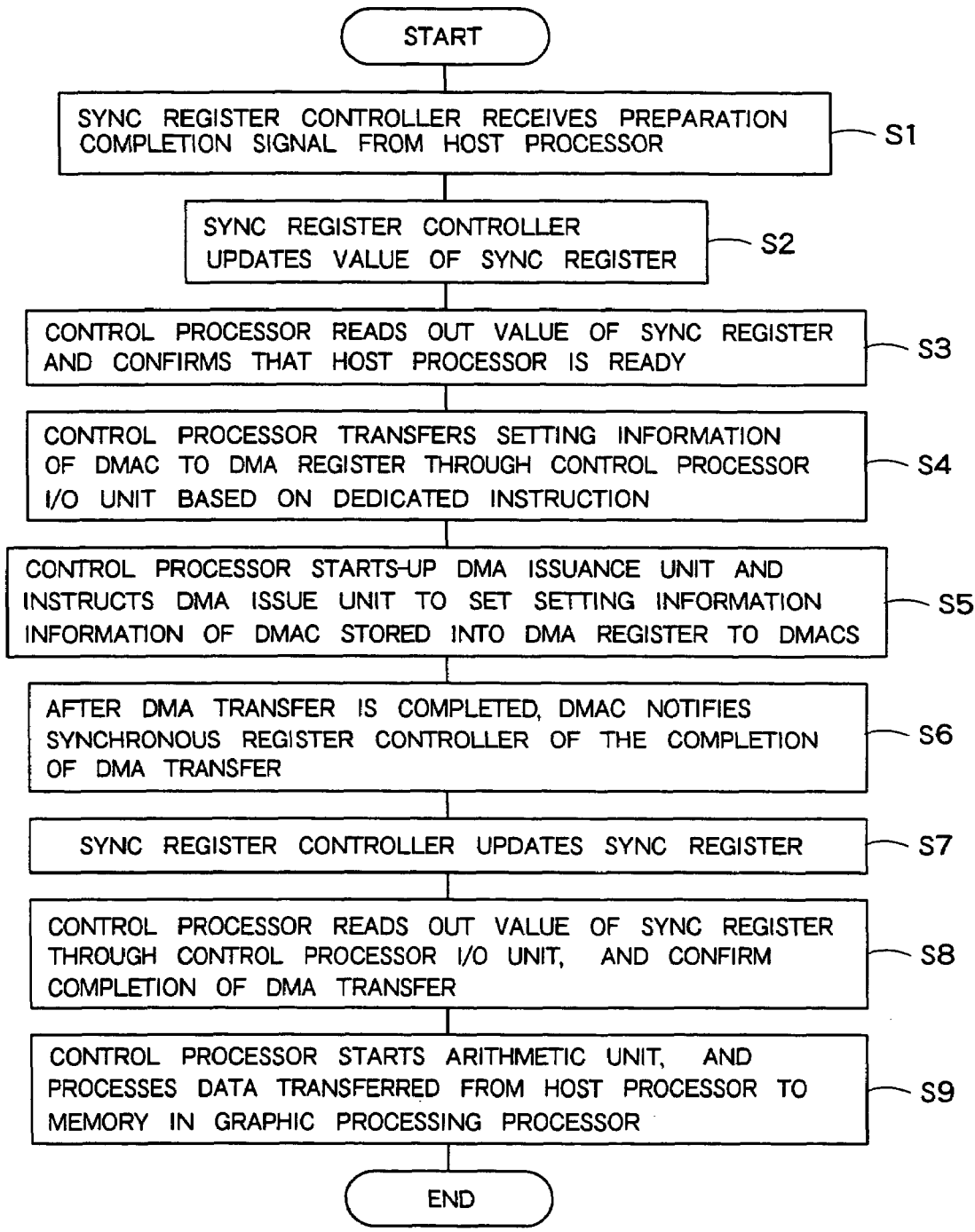
FIG. 5 is a flow chart showing an example of procedures performed by the controller 21 in FIG. 1.

FIG. 5 is a flow chart showing an example of procedures performed by the controller 21 in FIG. 1. This flow chart shows procedures performed when data prepared in the host processor 1 is DMA-transferred to the memory 36 in the graphic processing processor 2.

When data to be processed by the graphic processing processor 2 is prepared by the host processor 1, the host processor 1 transmits a preparation completion signal to the local network 37 in FIG. 3. This signal is received by the sync register control unit 45 in FIG. 4 (step S1).

The sync register control unit 45 updates the value of the sync register 44 (step S2). More specifically, the sync register 44 is set at a value representing that preparation for data transfer of the host processor 1 is completed.

The control processor 33 reads the value of the sync register 44 through the control processor I/O unit 41 according to a dedicated instruction to confirm that the preparation for the host processor 1 is completed (step S3). Here, the dedicated instruction expresses a task. An instruction string including the dedicated instruction (task) executed by the control processor 33 and the dedicated circuit 32 expresses a task string.

The control processor 33 transfers the setting information of the DMAC 31 to the DMA register 42 through the control processor I/O unit 41 (step S4).

The control processor 33 starts the DMA issuance unit 43 through the control processor I/O unit 41 based on a dedicated instruction, and instructs the DMA issuance unit 43 to set the setting information of the DMAC 31 stored in the DMA registers 42 in each DMAC 31 (step S5).

Thereafter, the DMAC 31 performs a DMA transfer. Upon completion of the DMA transfer, the DMAC 31 notifies the sync register control units 45 that the DMA transfer is completed (step S6). The sync register control units 45 updates the sync register 44 (step S7).

The control processor 33 reads the value of the sync resister through the control processor I/O unit 41 based on a dedicated instruction, and confirms that the DMA transfer is completed (step S8). Thereafter, the control processor 33 starts the arithmetic unit 27 through the control processor I/O unit 41, and processes data transferred from the host processor 1 to the memory in the graphic processing processor 2 (step S9).

As described above, the sync register control unit 45 in FIG. 4 monitors the value of the sync registers 44. Periodical monitoring is generally called "polling". The sync register control unit 45 according to this embodiment can monitor the operations of the DMAC 31, the arithmetic unit 27, and the host processor 1 by the polling.

In place of the monitoring of the sync register 44 by the sync register control unit 45, the control processor 33 may monitor the sync register 44 through the control processor I/O unit 41.

In this case, a command for controlling the DMAC 31 is called an instruction, and each command is constituted of, e.g., 256-bit data. The sync register control unit 45 and the sync register 44 in the dedicated circuit 32 serve as a task scheduler.

More specifically, the task includes a command related to data transfer control of the DMAC 31 and a command related to start-up control of the arithmetic units 27 and an initial setting for the arithmetic units 27, and a command related to an interruption notice for the host processor 1.

The dedicated circuit 32 according to this embodiment continuously execute tasks until a special task called a block task is executed. The block task is a task which waits for execution completion of a task (DMA execution or a process of a processor cluster) issued before the block task. When the block task is executed, the dedicated circuit 32 waits until the execution of the set tasks is completed.

Figure 6B:
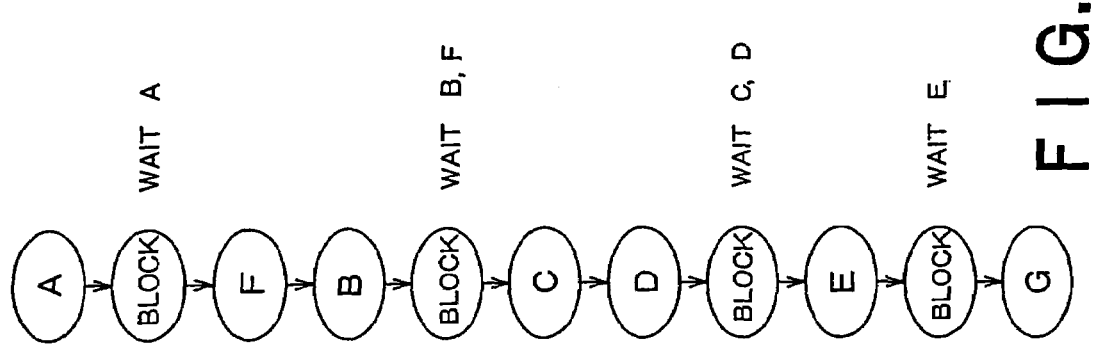
FIGS. 6A and 6B are diagrams showing an example of tasks executed by the dedicated circuit 32.
Figure 6A:
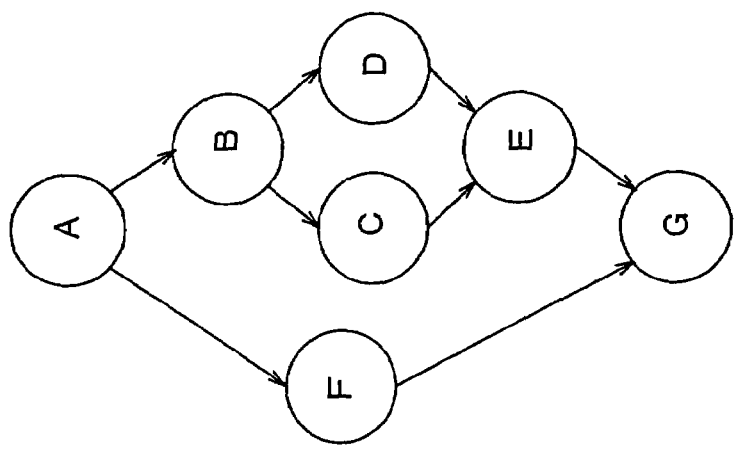

FIG. 6A is a diagram showing an example of tasks executed by the dedicated circuit 32, and shows an example in which tasks A, B, C, D, E, F, and G are executed. The tasks in FIG. 6A are written as a data flow chart as shown in FIG. 6B. The dedicated circuit 32 executes task A and waits for execution completion of task A as a block task. Upon completion of the execution of task A, the dedicated circuit 32 executes tasks F and B in parallel. The dedicated circuit 32 waits execution completion of the tasks F and B as block tasks. Upon completion of the execution of the tasks F and B, the dedicated circuit 32 executes tasks C and D in parallel. The dedicated circuit 32 waits for execution completion of the tasks C and D as block tasks. Upon completion of the execution of tasks C and D, the dedicated circuit 32 executes task E. The dedicated circuit 32 waits execution completion of task E as a block task. Upon completion of the execution of task E, the dedicated circuit 32 executes task G.

In this manner, a block task in FIG. 6B can synchronize a plurality of DMA transfers.

The dedicated circuit 32 of this embodiment can start the following DMA transfer by an event except for a notice of completion of a DMA transfer. The event mentioned here is, e.g., completion of a calculation process of the arithmetic units 27 or a notice from the host processor 1.

Figure 8:
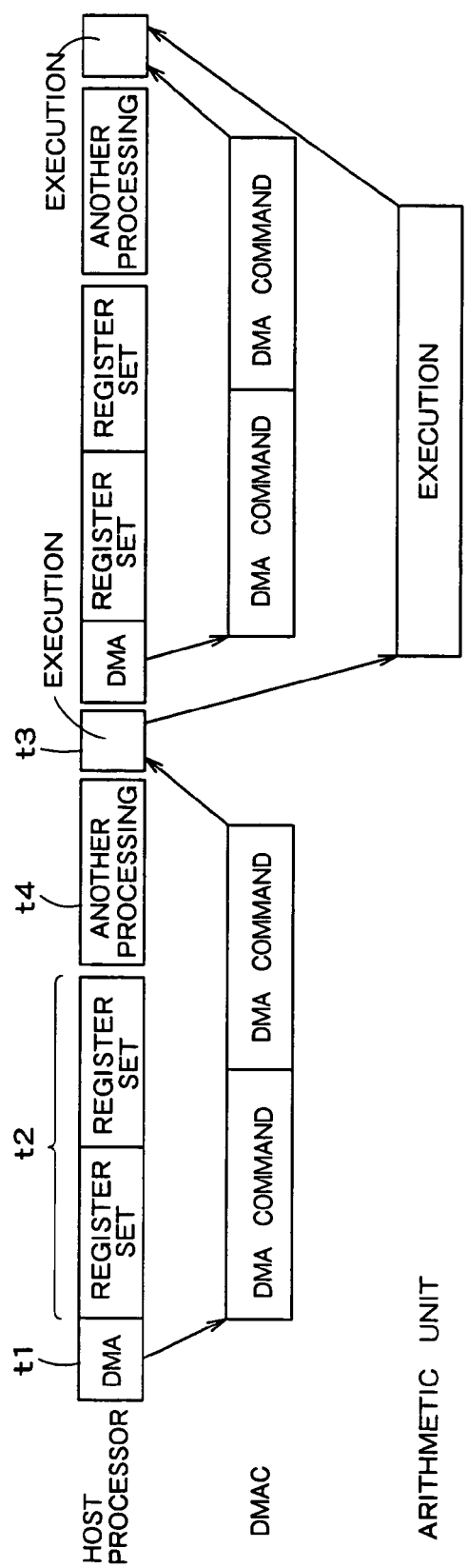
FIG. 8 is a timing chart corresponding to FIG. 7A.

FIG. 7A is a diagram showing a first operation of a conventional DMAC 31, FIG. 7B is a diagram showing a second operation of the conventional DMAC 31, and FIG. 7C is a diagram showing an operation of the DMAC 31 according to this embodiment. FIG. 8 is a timing chart corresponding to FIG. 7A, FIG. 9 is a timing chart corresponding to FIG. 7B, and FIG. 10 is a timing chart corresponding to FIG. 7C.

FIGS. 7A and 8 show most popular DMA transfers. After a certain DMA transfer is completed, the next DMA transfer is performed. In this case, as shown in FIG. 8, the host processor 1 (CPU) performs designation (t1) of DMA, register setting (t2) of the arithmetic unit 27, and designation of execution (t3) of the arithmetic unit 27. The DMAC 31 executes a DMA command designated by the host processor 1.

In the examples shown in FIGS. 7A and 8, various settings and designation related to a DMA transfer and the designation of execution of the arithmetic unit 27 are performed by the host processor 1. For this reason, load on the host processor 1 is excessively large. Therefore, a period (t4) in which the host processor 1 performs another process becomes short so that the performance of the host processor 1 is deteriorated.

Figure 9:
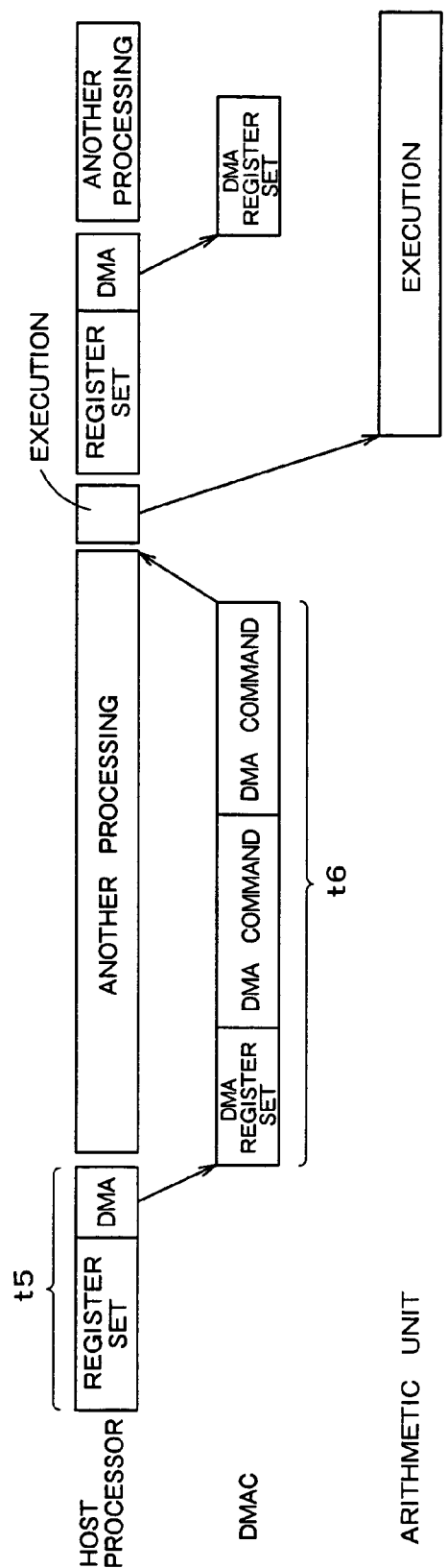
FIG. 9 is a timing chart corresponding to FIG. 7B.
Figure 10:
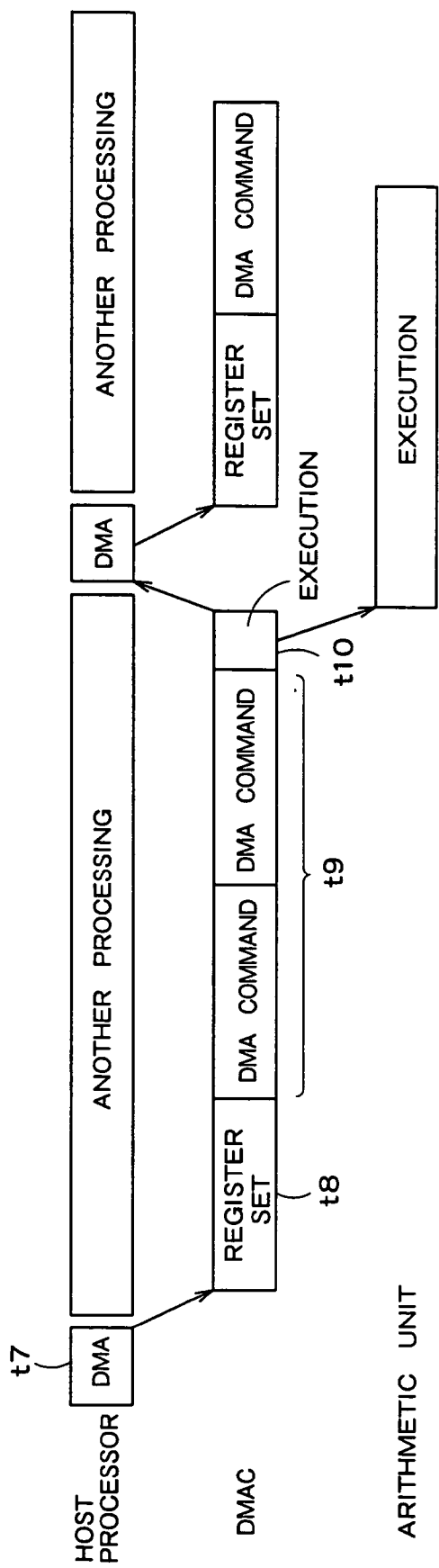
FIG. 10 is a timing chart corresponding to FIG. 7C.

In examples shown in FIGS. 7B and 9, a plurality of DMA transfers can be performed in parallel to each other. However, as shown in FIG. 9, the host processor 1 performs the register setting and the designation of start of the arithmetic unit 27 (period t5). According to the designation, the DMAC 31 transfers the register setting and the designation of start of the arithmetic unit 27 (period t6). In this example, since the register setting can be performed to the plurality of DMACs 31 in parallel, when the number of registers to be resister-set is large, processing load on the host processor 1 can be reduced. However, when only some registers are reset, as in the cases in FIGS. 7A and 8, the processing load on the host processor 1 increases.

On the other hand, in this embodiment shown in FIGS. 7C and 10, not only the next DMA transfer is performed by using only the end of a DMA transfer as a trigger, but also the next DMA transfer is performed by using a notice from the arithmetic unit 27 or the host processor 1 as a trigger. The DMAC 31 can perform register setting of the arithmetic unit 27 and designation of execution of the arithmetic unit 27. More specifically, as shown in FIG. 10, when the host processor 1 designates the DMAC 31 to perform a DMA transfer (period t7), in response to this designation, the DMAC 31 performs register setting (period t8) of the arithmetic unit 27, a DMA transfer (period t9), and designation of execution (period t10) of the arithmetic unit 27. Upon completion of the calculation process, the arithmetic unit 27 notifies the DMAC 31 of the end of the calculation process.

As shown in FIG. 10, since the DMAC 31 controls a DMA transfer and controls execution of the arithmetic unit 27, the host processor 1 can allocate long time to other processes. Therefore, the performance of the host processor 1 can be enhanced.

The operations of the host processor 1 and the controller 21 in the graphic processing processor 2 will be described in further detail. The host processor 1 reads a task string stored in the main memory 3 to transfer the task string to a memory in the graphic processing processor 2. This transfer process may be directly written in the memory by a store task of the host processor 1, or a DMA transfer may be performed as one of tasks.

The sync register control units 45 in the controller 21 sets pointer information or the like of a task string in the DMA register 42 of the DMAC 31. According to the contents of the DMA registers 42, the DMA issue device performs various settings to each DMAC 31.

The controller 21 can perform not only start-up control of the DMAC 31 but also start-up control of the arithmetic unit 27. As tasks used when the controller 21 controls the arithmetic unit 27, tasks of two types, i.e., a set task and a kick task are known. The set task is a task for performing various settings to the arithmetic unit 27. More specifically, various settings are performed to display a three-dimensional image such as a texture or a vertex. The kick task is a task for designating the start of execution of the arithmetic unit 27.

As described above, in the sync register 44, the operation states of the DMAC 31, the arithmetic unit 27, and the like are stored. The host processor 1 can read the value of the sync registers 44 through the sync register control units 45. Several methods may be used as methods of using the sync register 44. Typical one of these methods is shown in FIGS. 11, 12, and 13.

In FIG. 11, some process is performed by the controller 21 (step S11). The process result is written in the sync register 44 by a write task (step S12). The controller 21 interrupts the execution of the task until the controller 21 receives a notice for block cancellation from the host processor 1 (step S13). When the host processor 1 periodically performs polling of the sync register 44 (step S14) to acquire the values written in the sync register 44 in the write task, the host processor 1 notifies the controller 21 of block cancellation (step S15).

In FIG. 12, the controller 21 starts the arithmetic unit 27 by a kick task (step S16), and interrupts the execution of the tasks until the process in the arithmetic unit 27 is ended (step S17). The arithmetic unit 27 started by the kick task executes some process (step S18). Upon completion of the process, the arithmetic unit 27 transmits a completion notice to the controller 21 and writes a return value in the sync register 44 (step S19). The controller 21 which receives the completion notice performs branching with reference to a value of a general-purpose register (step S20).

In FIG. 13, some process is performed by the controller 21 (step S21). Upon completion of the process, the execution of the task is interrupted until the controller 21 receives a notice of block cancellation from the host processor 1 (step S22). The host processor 1 dynamically sets time when the execution of the task is restarted by the controller 21 (step S23). At that time, the host processor 1 cancels the block of the controller 21 and writes the return value in the sync register 44 (step S24). The controller 21 performs branching with reference to the value of the sync register 44 (step S25).

As described above, the controller 21 can simultaneously execute a plurality of task strings. As an example of the execution, a program which is executed such that data is transferred from the main memory 3 to a memory and the pointer of the data is set in the arithmetic unit 27 will be described below. In this case, the controller 21 simultaneously executes two task strings and synchronizes the task strings. This synchronization is performed by designation from the host processor 1.

It is assumed that, as shown in FIG. 14, the memory is divided into four regions (to be referred to as first-in-first-out (FIFO) 0 to 3 hereinafter). In one (to be referred to as Task String 1 hereinafter) of the two task strings, the main memory 3 transfers data to FIFO 0 to 3. In the other task string (to be referred to as Task String 2), data is transferred from FIFO 0 to 3 to the arithmetic unit 27.

Task String 2 actually performs an initial setting to the arithmetic unit 27 by a set task. The arithmetic unit 27 reads the data from the memory.

Figure 15:
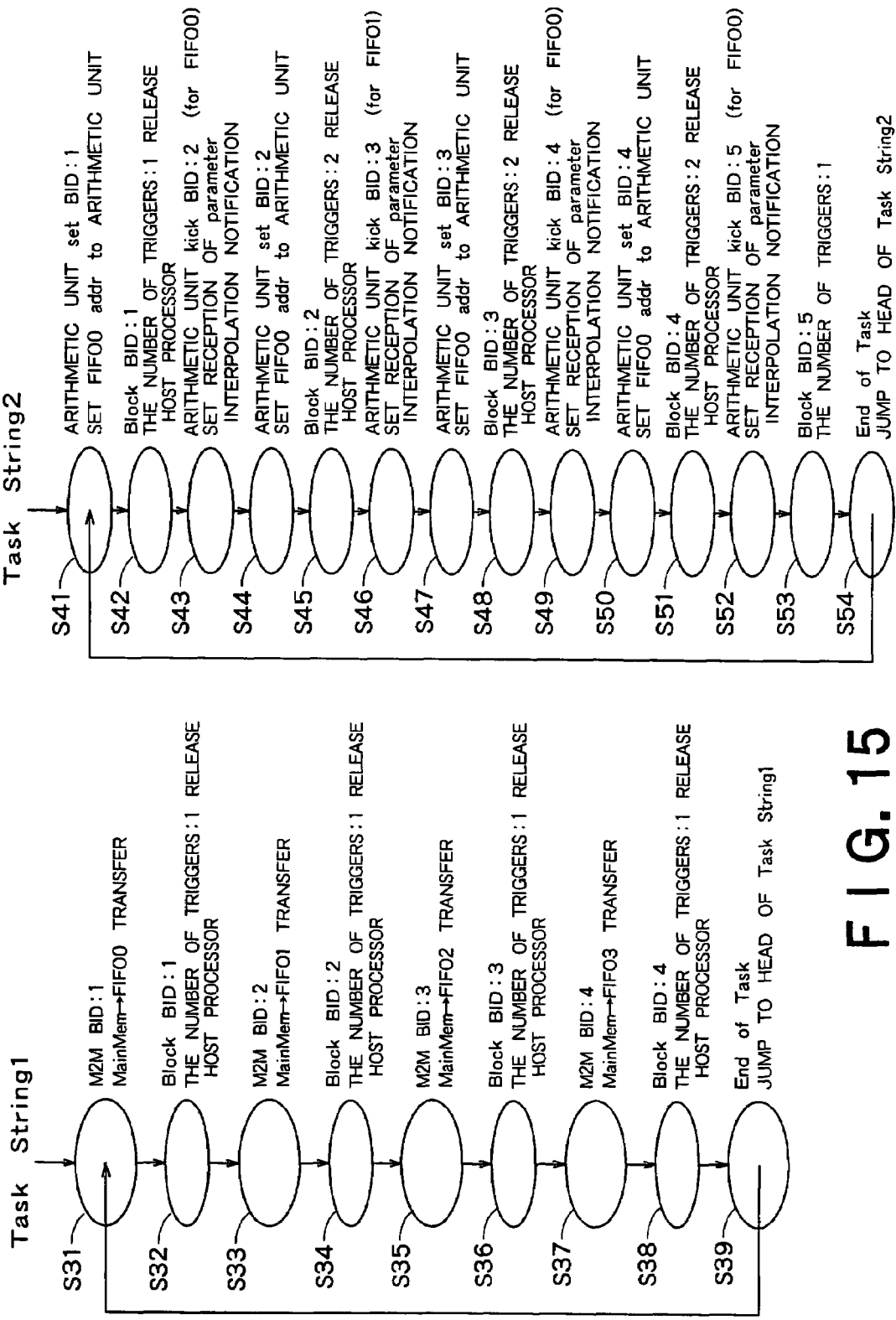
FIG. 15 is a data flow chart showing an example of procedures of the controller 21.

FIG. 15 is a data flow chart showing an example of procedures of the controller 21 which executes two Task Strings 1 and 2 described above. Task String 1 and Task String 2 in FIG. 15 are executed in parallel to each other. In Task String 1, data is sequentially transferred from the main memory 3 to FIFO 0 to 3. Thereafter the controller 21 returns to the top of Task String 1 (step S31 to S39). Each time the data transfer process to FIFO 0 to 3 is finished, the process is interrupted. When the controller 21 receives a notice of block cancellation from the host processor 1, the controller 21 performs the next data transfer process.

On the other hand, in Task String 2, the addresses of FIFO 0 to 3 are set in the arithmetic units 27, processes for designating the arithmetic units 27 to start are sequentially repeated, and the controller 21 returns to the top of Task String 2 (step S41 to S54). After the addresses of FIFO 0 to 3 are set in the arithmetic units 27, the process is interrupted. When the host processor 1 cancels the block, the next process is performed.

An example of a program of the host processor 1 for realizing the processes in FIG. 15 is as shown in FIG. 16.

In this manner, in the first embodiment, the graphic processing processor 2 having the controller 21 for performing start-up control of the plurality of DMACs 31 and the plurality of arithmetic units 27 is arranged independently of the host processor 1, so that control of the DMACs 31 and start designation of the arithmetic units 27 can be performed by the controller 21 in parallel to the processes performed in the host processor 1. For this reason, processing load on the host processor 1 can be reduced.

The start designation of the DMACs 31 and the arithmetic units 27 can also be performed by an event except for a notice of the end of DMA transfer. For this reason, task processes having higher degrees of freedom can be performed.

Second Embodiment

In the first embodiment described above, the example in which the start-up of the DMACs 31 and the arithmetic units 27 is controlled by the control processor 33 and the dedicated circuit 32 has been explained. However, the start-up control of the DMACs 31 and the arithmetic units 27 can be performed by only the dedicated circuit 32.

Figure 17:
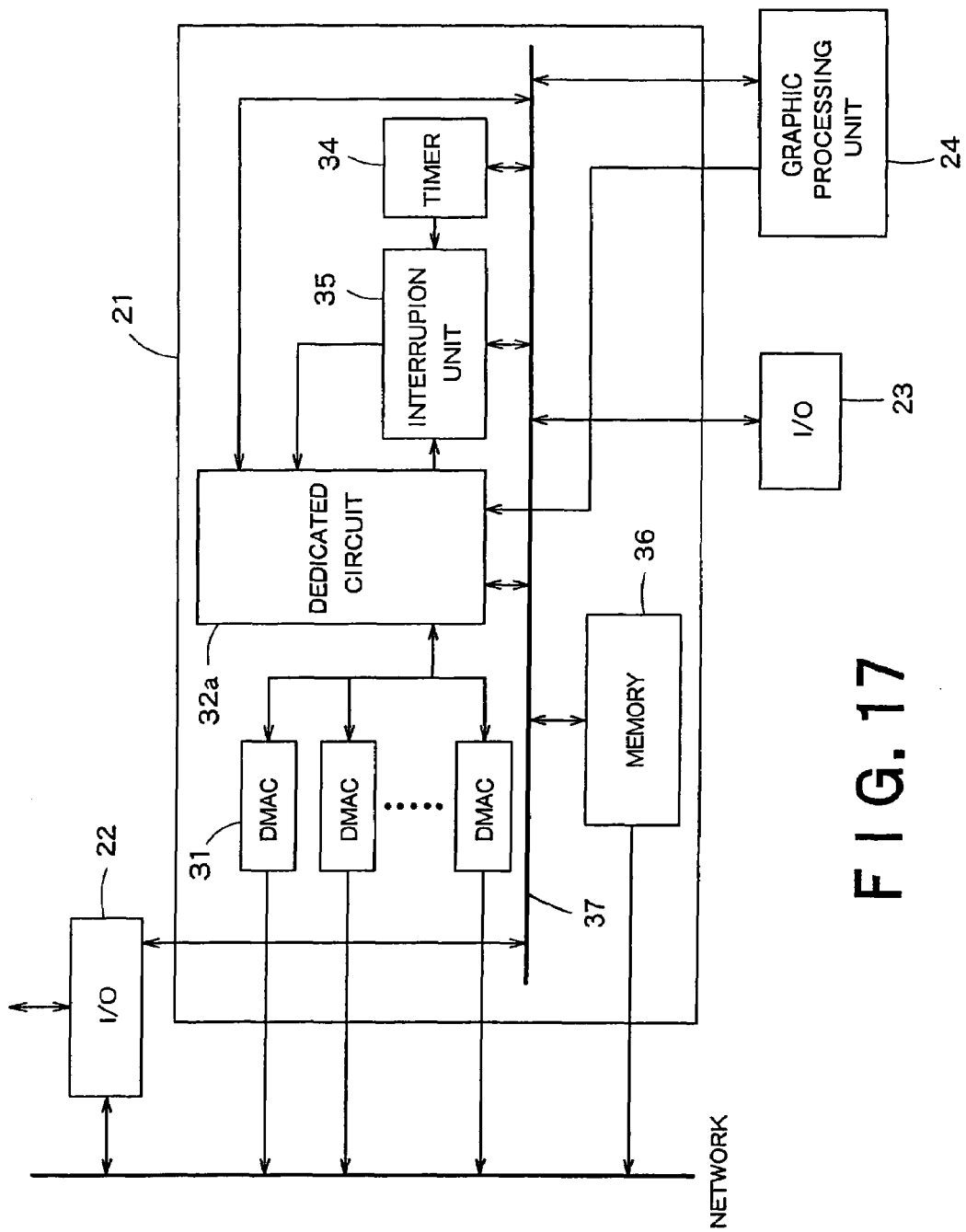
FIG. 17 is a block diagram showing the internal configuration of the controller 21 according to the second embodiment.

FIG. 17 is a block diagram showing the internal configuration of the controller 21 according to the second embodiment. The same reference numerals as in FIG. 3 denote the same parts in FIG. 17. Different points between FIG. 3 and FIG. 17 will be mainly described below. In the controller 21 in FIG. 17, the control processor 33 and the dedicated circuit 32 in FIG. 3 are integrated into one dedicated circuit 32a.

The dedicated circuit 32a in FIG. 17 controls the DMACs 31 and the arithmetic units 27 according to a program code stored in the memory 36.

Figure 18:
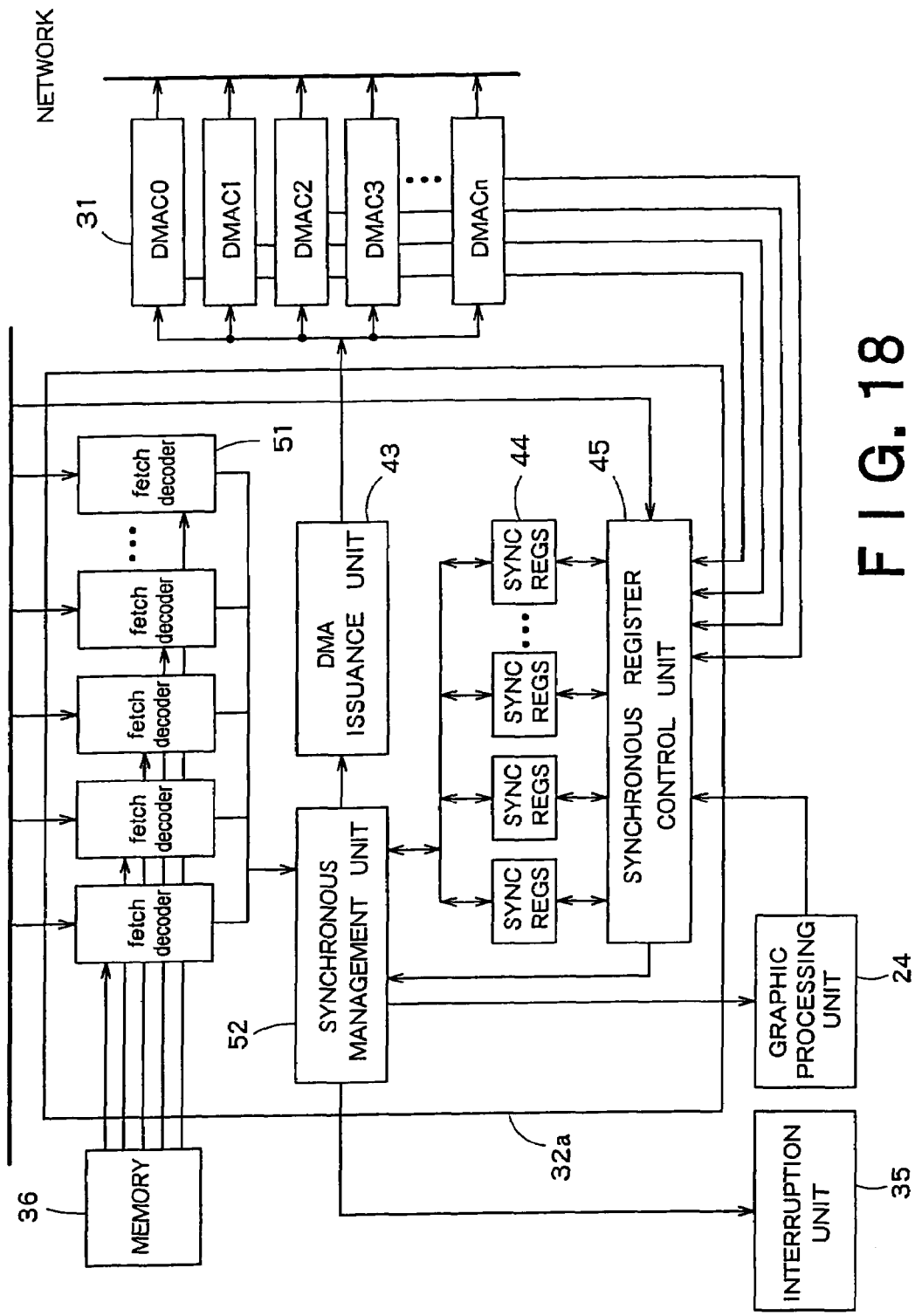
FIG. 18 is a block diagram showing an example of the internal configuration of the dedicated circuit 32a in FIG. 17.

FIG. 18 is a block diagram showing an example of the internal configuration of the dedicated circuit 32a in FIG. 17. The dedicated circuit 32a in FIG. 18 includes a task fetch decoder 51, a sync management unit 52, a DMA issuance unit 43, a plurality of sync registers 44, and a sync register control units 45.

The task fetch decoder 51 interprets a program code stored in a memory 36. The sync management unit 52 executes a task interpreted by the task fetch decoder 51 and reads values of the sync registers 44 to control the arithmetic units 27 and the DMA issuance unit 43.

Figure 19:
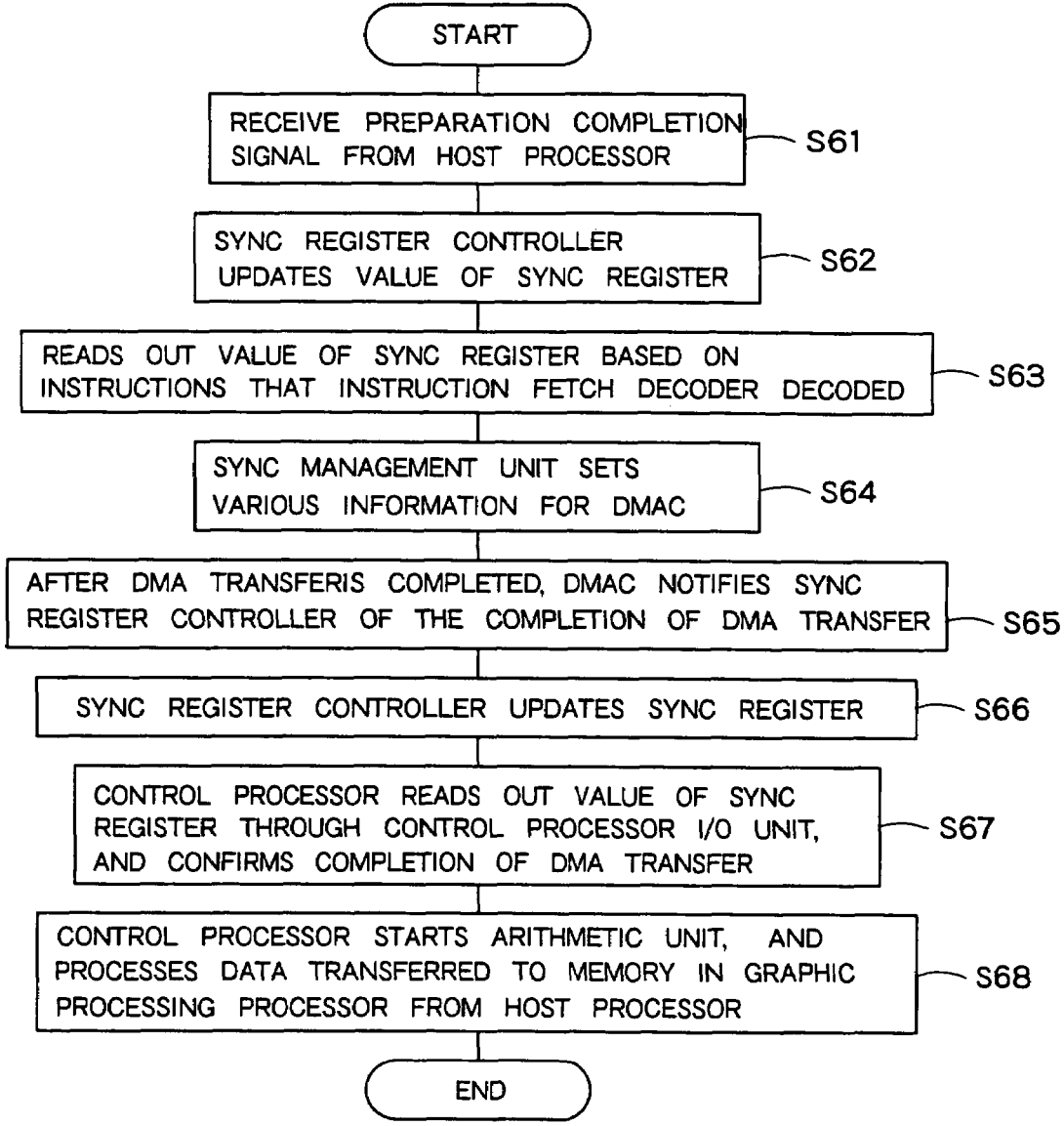
FIG. 19 is a flow chart showing an example of a procedure performed by the controller 21 in FIG. 17.

FIG. 19 is a flow chart showing an example of a procedure performed by the controller 21 in FIG. 17. Different processes between the flow chart in FIG. 19 and the flow chart in FIG. 5 will be mainly described below. After receiving a preparation completion signal from the host processor 1 (step S61), and after the sync register control units 45 updates the value of the sync register 44 (step S62), the sync management unit 52 reads the value of the sync register 44 according to ask decoded by the task fetch decoder 51 (step S63). In this manner, it is confirmed that preparation for data transfer in the preparation of the host processor 1 is completed.

The sync management unit 52 sets various pieces of information to the DMACs 31 to transfer pieces of information (in this case, data prepared in the host processor 1) to be set in the DMACs 31 to the memory in the graphic processing processor 2 (step S64).

When the DMAC 31 ends the DMA transfer after the DMAC 31 is started, a completion signal is transmitted to the sync register control units 45 (step S65). The sync register control units 45 updates the sync registers 44 (step S66).

According to the task decoded by the task fetch decoder 51, the sync management unit 52 reads the value of the sync register 44 (step S67) to confirm the completion of the DMAC 31.

According to the task decoded by the task fetch decoder 51, the sync management unit 52 starts the arithmetic unit 27 to start processing of the data transferred from the host processor 1 to the memory in the graphic processing processor 2 (step S68).

As described above, in the second embodiment, start-up control of the DMAC 31 and the arithmetic unit 27 is realized by only the dedicated circuit 32a. For this reason, a circuit scale which is smaller than a circuit scale obtained by using a general-purpose processor can be achieved, and a low power consumption can also be achieved.

Each of the above embodiments exemplifies the case in which the controller 21 is arranged in the graphic processing processor 2. However, the controller 21 may be arranged outside the graphic processing processor 2.

Each of the above embodiments exemplifies the case in which the host processor 1 and the graphic processing processor 2 are formed as different chips. However, the host processor 1 and the graphic processing processor 2 can also be formed as a macro core on the same chip. In this case, the controller 21 is desirably arranged in the graphic processing processor 2. However, the controller 21 may be arranged outside the graphic processing processor 2.

Each of the above embodiments exemplifies the case in which the controller 21 is dedicated to data processing performed by the graphic processing processor 2. However, the controller 21 can also control another DMAC, i.e., a DMAC in the host processor 1. In this case, another controller may be arranged in the host processor 1 independently of the controller 21. The DMAC in the host processor 1 and the DMAC in the graphic processing processor 2 can also be controlled by a common controller.

The same function as described above can also be processed by an OS (Operating System) in place of the controller 21.

The processor system according to the present invention can be built in a game machine, a home server, a television set, a portable information device, or the like.

Figure 20:
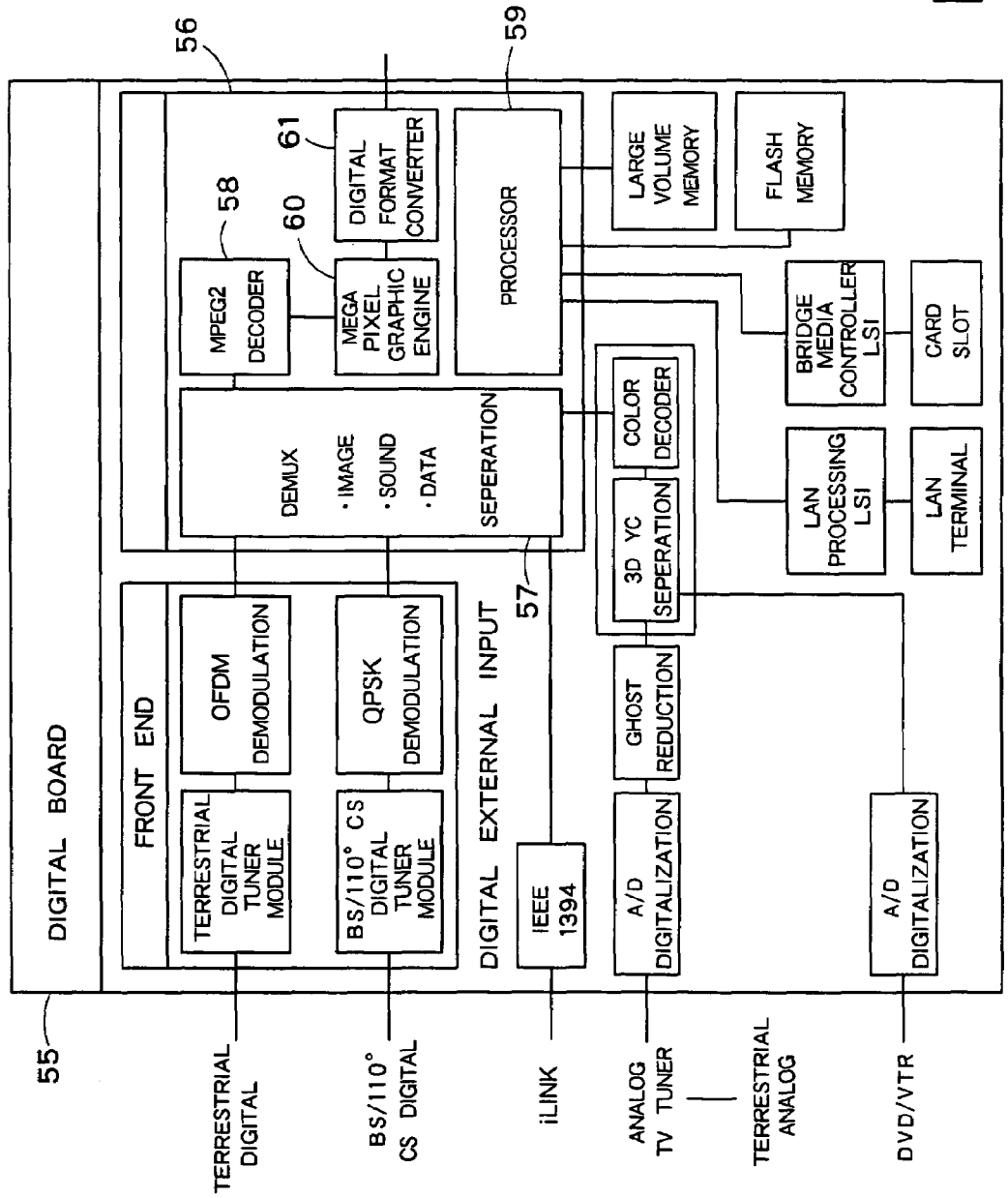
FIG. 20 is a block diagram showing a case in which the processor system according to this application is built in a digital television set.

FIG. 20 is a block diagram showing a case in which the processor system according to this application is built in a digital television set. The digital television set serving as an example of the configuration includes a digital board 55 for controlling communication information. The digital board 55 includes a processor system 56 for realizing the same function as that in FIG. 1 in which image information is controlled. More specifically, the processor system 56 includes a transceiver circuit (DEMUX) 57 for transmitting/receiving video and communication information, a decoder circuit 58, a processor (CPU) 59, a graphic processing circuit (graphic engine) 60, and a digital format converter 61.

FIG. 21 is a block diagram showing an example in which the processor system according to this embodiment is built in a video recorder/player. As an example of the configuration, this video recorder/player includes an image information control circuit 62 which realizes the same function as shown in FIG. 1 and which controls image information. More specifically, the image information control circuit 62 includes a processor (CPU) 63, a digital signal processor (DSP) 64, a processor 65 for processing video (image) data, and a processor 66 for processing audio data.

What is claimed is:

1. A processor system, comprising:
   an image processing unit including a plurality of arithmetic units capable of performing arithmetic processings in parallel;
   a storage which stores data that said plurality of arithmetic units use for arithmetic processings;
   a plurality of DMA controllers which perform data transfer between said plurality of arithmetic units, and between said plurality of arithmetic units and said storage in parallel with processings of a host processor;
   a first DMA control circuit which controls start-up of said plurality of arithmetic units and said plurality of DMA controllers in parallel with processings of said host processor; and
   a second DMA control circuit which communicates with said host processor, controls said first DMA control circuit, and performs data processing with the image processing units
   wherein the first DMA control circuit further comprises,
      a DMA register which stores setting information of the plurality of DMA controllers,
      a sync register which stores an operational status of the plurality of DMA controllers and the plurality of arithmetic units,
      a sync register controller which controls the sync register, and
      a DMA issuance unit which sends start-up signals to the plurality of DMA controllers,
   wherein the second DMA control circuit checks the sync register to detect whether the host processor is ready to perform a DMA transfer, and then controls a storing operation of the setting information of the DMA controllers into the DMA register, and then instructs the DMA issuance unit to set information stored in the DMA register to the plurality of DMA controllers.

2. The processor system according to claim 1, wherein said first DMA control circuit controls start-up of said plurality of DMA controllers so that said plurality of DMA controllers perform data transfer in parallel.

3. The processor system according to claim 1, wherein said first DMA control circuit controls start-up of said plurality of arithmetic units and said plurality of DMA controllers, based on a prescribed event including at least one of a notification of data transfer completion transferred from said plurality of DMA controllers, a notification of arithmetic processing completion transferred from said plurality of arithmetic units and a notification transferred from said host processor.

4. The processor system according to claim 3, further comprising a status storage which stores information relating to operation status of said plurality of arithmetic units and said plurality of DMA controllers,
   wherein said first DMA control circuit controls start-up of said plurality of arithmetic units and said plurality of DMA controllers, based on contents stored in said status storage.

5. The processor system according to claim 4, further comprising a DMA information storage which stores information necessary to operate said plurality of DMA controllers,
   wherein said first DMA control circuit updates contents stored in said DMA information storage based on contents stored in said status storage.

6. The processor system according to claim 1, wherein said first DMA control circuit performs initial settings of said plurality of arithmetic units and said plurality of DMA controllers.

7. The processor system according to claim 1, wherein
   said first DMA control circuit includes a dedicated arithmetic processing circuit which performs arithmetic processings based on an inherent algorism; and
   said second DMA control circuit includes a general-purpose processor which performs arithmetic processing based on versatile program codes.

8. The processor system according to claim 7, wherein said general-purpose processor instructs said dedicated arithmetic processing circuit based on the program codes in which starting sequences of said plurality of arithmetic units and said plurality of DMA controllers are described.

9. The processor system according to claim 1, further comprising:
   a starting sequence storage which stores program codes in which starting sequences of said plurality of arithmetic units and said plurality of DMA controllers are described;
   wherein said first DMA control circuit includes a starting controller which controls start-up of said plurality of arithmetic units and said plurality of DMA controllers based on the program codes stored in said starting sequence storage.

10. The processor system according to claim 1, wherein
    said plurality of arithmetic units, said storage, said plurality of DMA controllers, and said first and second DMA control circuits are provided inside said image processing unit.

11. The processor system according to claim 10, further comprising:
    a pixel converter which converts vertex information of polygons into pixel data; and
    a bus to which said pixel converter, said first and second DMA control circuits and said storage are commonly connected,
    wherein said plurality of arithmetic units perform arithmetic operations by using the output of said pixel converter and data stored in said storage.

12. The processor system according to claim 1, wherein said storage is an embedded DRAM provided separately from a main memory.

13. A DMA control circuit, comprising:
    a plurality of instruction storages which store information relating to a plurality of instructions instructed from a host processor, respectively; and
    a first DMA control circuit which performs data transfer between a plurality of arithmetic units each being capable of performing arithmetic processings in parallel, data transfer between a storage which stores data that said plurality of arithmetic units use for arithmetic processings and said plurality of arithmetic units, and starting control of said plurality of arithmetic units, based on information stored in said plurality of instruction storages, in parallel with processings of said host processor; and
    a second DMA control circuit which communicates with said host processor, controls said first DMA control circuit, and performs data processing with the image processing unit,
    wherein the first DMA control circuit further comprises,
       a DMA register which stores setting information of the plurality of DMA controllers,
       a sync register which stores an operational status of the plurality of DMA controllers and the plurality of arithmetic units,
       a sync register controller which controls the sync register, and a DMA issuance unit which sends start-up signals to the plurality of DMA controllers, wherein the second DMA control circuit checks the sync register to detect whether the host processor is ready to perform a DMA transfer, and then controls a storing operation of the setting information of the DMA controllers into the DMA register, and then instructs the DMA issuance unit to set information stored in the DMA register to the plurality of DMA controllers.

* * * * *